United States Patent
Hou et al.

(10) Patent No.: US 10,495,875 B2
(45) Date of Patent: *Dec. 3, 2019

(54) METHOD FOR DESIGNING OFF-AXIS THREE-MIRROR IMAGING SYSTEM WITH FREEFORM SURFACES

(71) Applicants: Tsinghua University, Beijing (CN); HON HAI PRECISION INDUSTRY CO., LTD., New Taipei (TW)

(72) Inventors: Wei Hou, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1160 days.

This patent is subject to a terminal disclaimer.

(21) Appl. No.: 14/814,497

(22) Filed: Jul. 30, 2015

(65) Prior Publication Data
US 2016/0170191 A1 Jun. 16, 2016

(30) Foreign Application Priority Data
Dec. 11, 2014 (CN) .......................... 2014 1 0755486

(51) Int. Cl.
*G02B 17/06* (2006.01)
*G02B 27/00* (2006.01)

(52) U.S. Cl.
CPC ..... *G02B 27/0012* (2013.01); *G02B 17/0642* (2013.01)

(58) Field of Classification Search
CPC ............... G02B 27/0012; G02B 17/06; G02B 17/0626; G02B 17/0642
USPC ................ 359/365, 727, 730, 858, 861, 900
See application file for complete search history.

(56) References Cited

U.S. PATENT DOCUMENTS

| | | | | |
|---|---|---|---|---|
| 8,975,571 B2 * | 3/2015 | Hou | .................... | G02B 17/0621 |
| | | | | 250/208.1 |
| 9,250,428 B2 * | 2/2016 | Zhu | .................... | G02B 17/0642 |
| 9,268,122 B2 * | 2/2016 | Zhu | ........................ | G01J 1/0414 |
| 9,268,123 B2 * | 2/2016 | Zhu | .................... | G02B 17/0642 |
| 9,405,109 B2 * | 8/2016 | Yang | .................. | G02B 17/0642 |
| 9,524,565 B2 * | 12/2016 | Zhu | .................... | G02B 27/0012 |
| 9,568,717 B2 * | 2/2017 | Hou | .................... | G02B 17/0636 |
| 9,703,084 B2 * | 7/2017 | Zhu | .................... | G02B 17/0642 |
| 9,846,298 B2 * | 12/2017 | Zhu | .................... | G02B 17/0642 |

(Continued)

*Primary Examiner* — Ricky D Shafer
(74) *Attorney, Agent, or Firm* — ScienBiziP, P.C.

(57) ABSTRACT

A method for designing an off-axis three-mirror imaging system with freeform surfaces is provided. A primary mirror initial structure, a secondary mirror initial structure, and a tertiary mirror initial structure are established. A number of first feature rays are selected, while the primary mirror initial structure and the secondary mirror initial structure unchanged. The first feature rays are forward ray tracked from an object space to an image detector. A number of first feature data points are calculated to obtain a tertiary mirror. A number of fields and a number of second feature rays are selected, while the secondary mirror initial structure and the tertiary mirror unchanged. The second feature rays are reverse ray tracked from the image detector to the object space. A number of second feature data points are calculated to obtain the primary mirror.

16 Claims, 15 Drawing Sheets

(56) References Cited

U.S. PATENT DOCUMENTS

| | | | |
|---|---|---|---|
| 10,101,204 B2* | 10/2018 | Zhu | G01J 3/0289 |
| 2016/0232258 A1* | 8/2016 | Yang | G02B 17/0642 |
| 2016/0232718 A1* | 8/2016 | Zhu | G06T 19/20 |
| 2018/0180877 A1* | 6/2018 | Hou | G02B 27/0012 |

* cited by examiner

METHOD FOR DESIGNING OFF-AXIS THREE-MIRROR IMAGING SYSTEM WITH FREEFORM SURFACES

CROSS-REFERENCE TO RELATED APPLICATIONS

This application claims all benefits accruing under 35 U.S.C. § 119 from China Patent Application No. 201410755486.X, field on Dec. 11, 2014 in the China Intellectual Property Office, disclosure of which is incorporated herein by reference. The application is also related to co-pending applications entitled, "OFF-AXIS THREE-MIRROR OPTICAL SYSTEM WITH FREEFORM SURFACES", filed Jul. 30, 2015 Ser. No. 14/814,499.

BACKGROUND

1. Technical Field

The present disclosure relates to a method for designing imaging systems, especially a method for designing off-axis three-mirror imaging system with freeform surfaces.

2. Description of Related Art

Reflective imaging systems can work on any spectrum band. Reflective imaging systems have light weight and small volume due to their compact structure. Additionally, light obscurations can be avoided in reflective imaging systems by an offset aperture stop or off-axis fields, therefore, the stray light can be well-controlled in reflective imaging systems. However, since the off-axis aberrations induced by a non-rotational symmetric structure cannot be easily corrected, it is difficult to achieve an ultra-wide field-of-view (FOV), such as larger than 60 degrees, in reflective imaging systems with spherical or aspheric surfaces.

Freeform surfaces have more degrees of freedom, which can reduce the aberrations and simplify the structure of the system in optical design. In recent years, with the development of the advancing manufacturing technologies, freeform surfaces have been successfully used in the optical field, such as head-mounted-displays, reflective systems, varifocal panoramic optical systems, and micro-lens arrays.

However, in conventional designing methods for off-axis imaging system with freeform surfaces, the primary mirror is traced before the aperture stop, so the changes of the optical power of primary mirror during the designing process may affect the size and position of the aperture stop. Additionally, the number of fields considered in conventional designing methods is limited, and the field-of-view is small.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
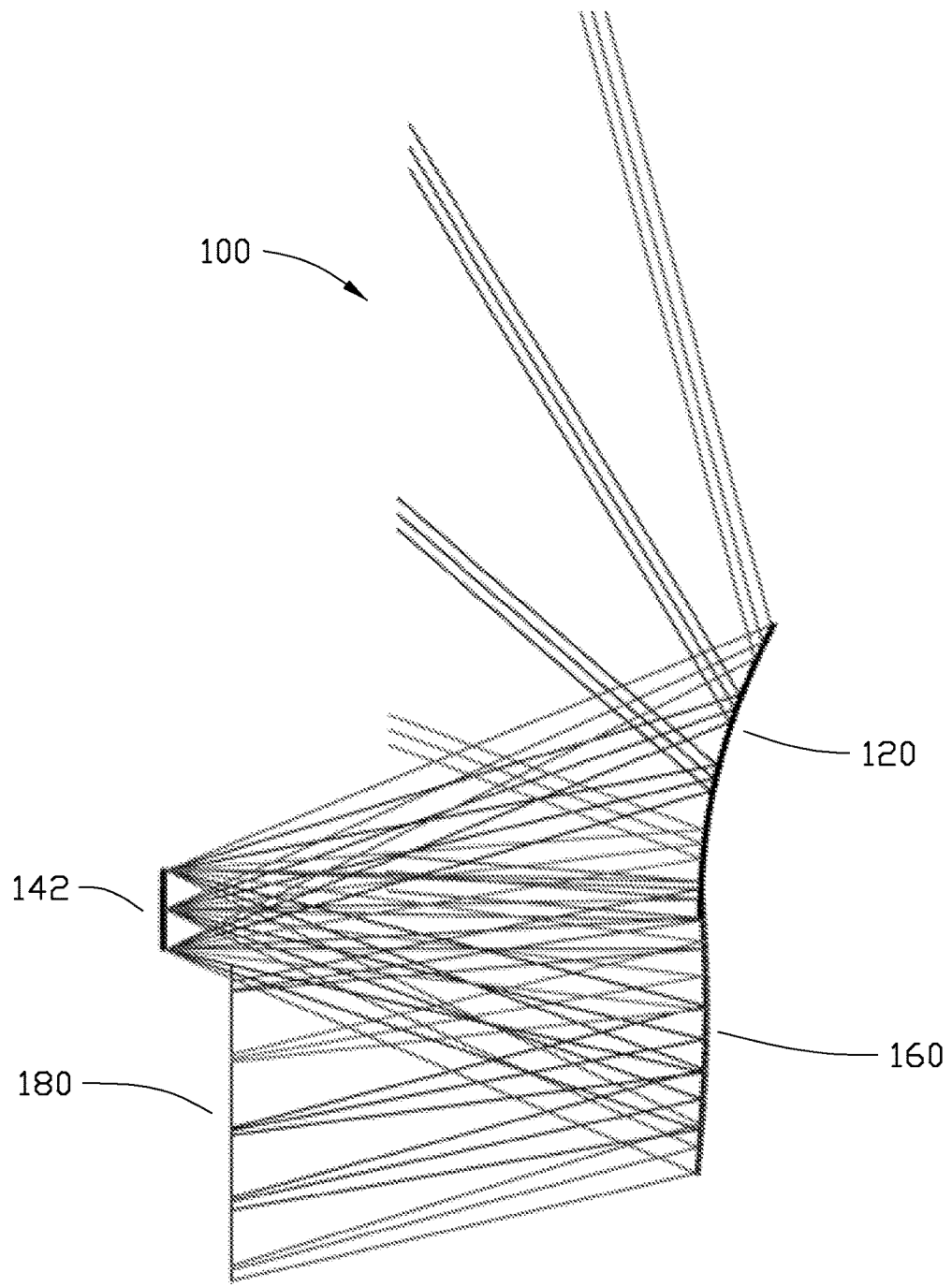
FIG. 1 is a schematic view of one embodiment of an off-axis three-mirror imaging system with freeform surfaces.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

FIG. 1 illustrates one embodiment of an off-axis three-mirror imaging system with freeform surfaces 100. The off-axis three-mirror imaging system with freeform surfaces 100 includes a primary mirror 120, a secondary mirror initial structure 142, and a tertiary mirror 160. The secondary mirror initial structure 142 is an aperture stop. Light rays from the light source are successively reflected by the primary mirror 120, the secondary mirror initial structure 142 and the tertiary mirror 160; and then form an image on an image detector 180. A reflective surface of the primary mirror 120 can be convex, which is suitable for reflective systems with ultra-wide FOV.

A method for designing the off-axis three-mirror imaging system with freeform surfaces 100 includes the following steps:

step (S1), establishing an initial system, the initial system includes a primary mirror initial structure 122, a secondary mirror initial structure 142, and a tertiary mirror initial structure 162;

step (S2), keeping the primary mirror initial structure 122 and the secondary mirror initial structure 142 unchanged; selecting a plurality of first feature rays, the plurality of first feature rays are forward rays tracked from an object space to the image detector 180; and calculating a plurality of first feature data points $P_i$ (i=1, 2 ... K) point by point based on the object-image relationship of the plurality of first feature rays, to obtain the tertiary mirror 160 by surface fitting the plurality of first feature data points $P_i$ (i=1, 2 ... K);

step (S3), keeping the secondary mirror initial structure 142 and the tertiary mirror 160 unchanged; selecting a plurality of fields and a plurality of second feature rays, the plurality of second feature rays are reverse rays tracked from the image detector 180 to the object space; and calculating a plurality of second feature data points $P_i'$ (i=1, 2 ... K) point by point based on the object-image relationship of the plurality of second feature rays, to obtain the primary mirror 120 by surface fitting the plurality of second feature data points $P_i'$ (i=1, 2 ... K).

In step (S1), the primary mirror initial structure 122, the secondary mirror initial structure 142, and the tertiary mirror initial structure 162 can be planar, spherical, or other surface types. A location of the primary mirror initial structure, a location of the secondary mirror initial structure and a location of the tertiary mirror initial structure can be selected according to the actual need of the imaging systems. As long as a plurality of intersections of the emitted light rays and the image detector 180 are close to the image points.

Figure 2:
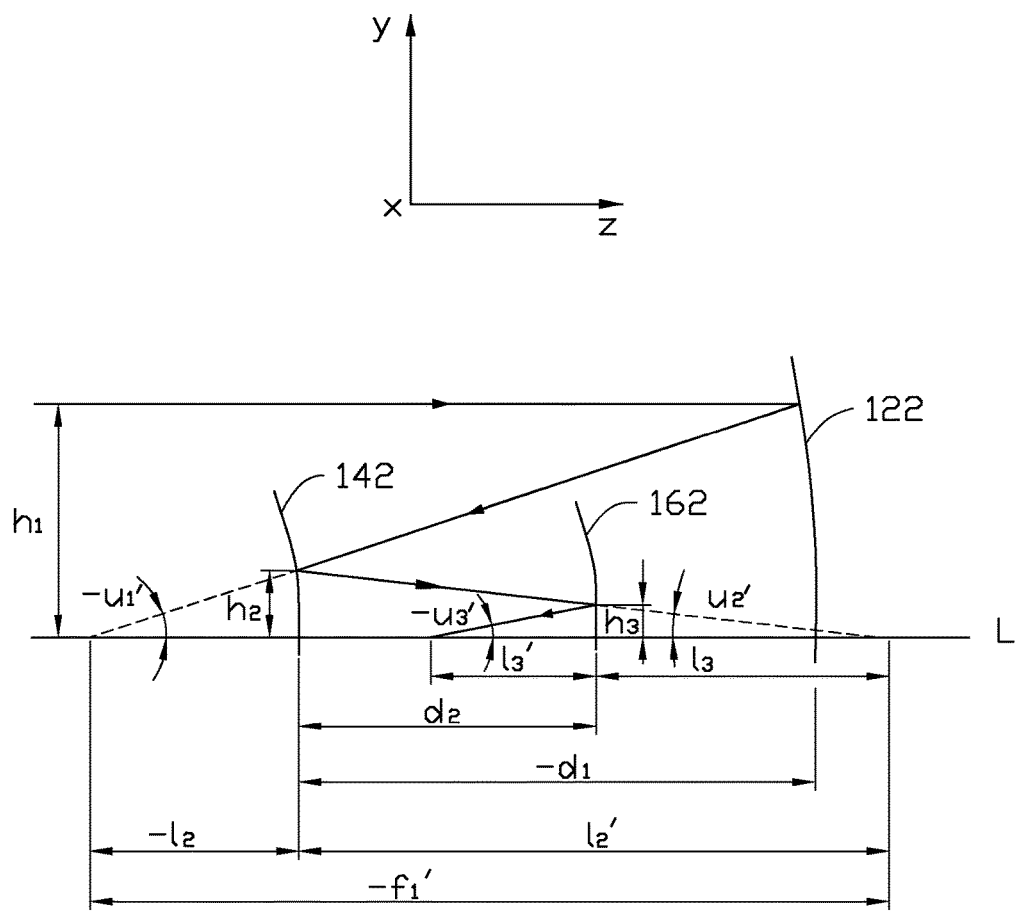
FIG. 2 is a schematic view of one embodiment of a spherical initial system.

FIG. 2 illustrates in one embodiment, the initial system is a spherical system. A horizontal line through the center of the aperture stop is defined as a reference axis L. $\Phi$ is the focal power of the spherical system. $c_1$, $c_2$ $c_3$ are respectively the surface curvature of the primary mirror initial structure 122, the secondary mirror initial structure 142, and the tertiary mirror initial structure 162. $d_1$ is the distance between the primary mirror initial structure 122 and the secondary mirror initial structure 142, $d_2$ is the distance between the secondary mirror initial structure 142 and the tertiary mirror initial structure 162, and $l_3'$ is the distance between the tertiary mirror initial structure 162 and the image detector 180. $f_1'$ is the focal length of the primary mirror initial structure 122, and f is the focal length of the spherical system. $h_1$ is the vertical distance between the reference axis L and the intersection of the lights and the primary mirror initial structure 122, $h_2$ is the vertical distance between the reference axis L and the intersection of the lights and the secondary mirror initial structure 142, and $h_3$ is the vertical distance between the reference axis L and the intersection of the lights and the tertiary mirror initial structure 162. $r_1$, $r_2$, $r_3$ are respectively the radius of the primary mirror initial structure 122, the secondary mirror initial structure 142, and the tertiary mirror initial structure 162. The following formula can be established based on the paraxial optical theory.

$$u_1' = 2c_1 h_1, \qquad (1)$$

$$u_2' = h_2 / l_2', \qquad (2)$$

$$h_2 / h_1 = l_2 / f_1', \qquad (3)$$

$$\frac{1}{l_2'} + \frac{1}{l_2} = \frac{2}{r_2}, \qquad (4)$$

$$l_2 = f_1' - d_1. \qquad (5)$$

So $$u_2' = -2h_1(c_1 - c_2 + 2d_1 c_1 c_2) \qquad (6), \text{ and}$$

$$h_2 = h_1(1 - 2d_1 c_1) \qquad (7).$$

Similarly, $$u_3' = (h_2 - u_2' d_2)/l_3' \qquad (8).$$

From $u_3'$, $$1/f' = \Phi = u_3'/h_1 \qquad (9).$$

So $$l_3'\Phi = 1 - 2d_1 c_1 - 2d_2 c_2 + 2d_2 c_1 + 4d_1 d_2 c_1 c_2 \qquad (10).$$

To $r_3$, $$u_3 l_3' = u_2 l_3 \qquad (11), \text{ and}$$

$$l_3' = l_3(2l_3''/r_3 - 1) \qquad (12).$$

That is $$u_3' = 2c_3 l_3' u_3' - u_2' \qquad (13).$$

Then divided by $h_1$, $$\Phi = 2c_3 l_3'\Phi + 2c_1 - 2c_2 + 4d_1 c_1 c_2 \qquad (14).$$

The field curvature $S_{IV}$ should be kept as zero, so Eq. (15) can be derived based on the primary aberration theory, $$c_1 + c_3 = c_2 \qquad (15).$$

When the focal power $\Phi$ and $d_1$, $d_2$, $l_3'$ are determined, from the Eq. (10), (14) and (15), the radius of the primary mirror initial structure 122, the secondary mirror initial structure 142, and the tertiary mirror initial structure 162 can be solved.

The optical power of the primary mirror initial structure 122 can be positive or negative, depending on the focal power $\Phi$ and $d_1$, $d_2$, $l_3'$.

In step (S2), a light path of the plurality of first feature rays can be depicted as follows. First, the plurality of first feature rays from the object space reaches the primary mirror initial structure 122, and is reflected by the primary mirror initial structure 122 to form a first reflected light $R_1$. Second, the first reflected light $R_1$ reaches the secondary mirror initial structure 142, and is reflected by the secondary mirror initial structure 142 to form a second reflected light $R_2$. Third, the second reflected light $R_2$ reaches the tertiary mirror initial structure 162, and is reflected by the tertiary mirror initial structure 162 to form a third reflected light $R_3$. Finally, the third reflected light $R_3$ is received by the image detector 180.

The selecting of the plurality of first feature rays includes steps of: M fields are selected according to the optical systems actual need, an aperture of each of the M fields is divided into N equal parts, and P feature rays at different aperture positions in each of the N equal parts are selected. As such, K=M×N×P first feature rays correspond to different aperture positions and different fields are fixed. The aperture can be a circle, a rectangle, a square, an oval or other shapes.

When the aperture of each of the M fields is a circle, a circular aperture of each of the M fields is divided into N angles with equal interval $\varphi$, as such, N=2π/$\varphi$, then, P different aperture positions are fixed along a radial direction of each of the N angles. Therefore, K=M×N×P first feature rays correspond to different aperture positions and different fields are fixed. In one embodiment, five fields are fixed in the construction process; a circular aperture of each of the five fields is divided into eight angles with equal intervals, and five different aperture positions are fixed along the radial direction of each of the fourteen angles. Therefore, 200 first feature rays corresponding to different aperture positions and different fields are fixed.

Figure 3:
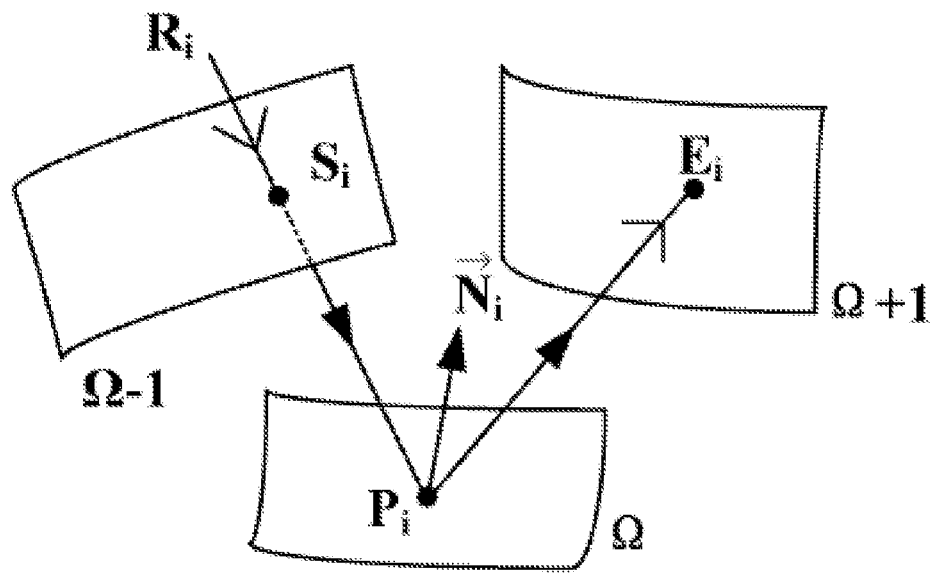
FIG. 3 is a schematic view of start point and end point of one feature ray while solving the feature data points according to one embodiment.
Figure 4:
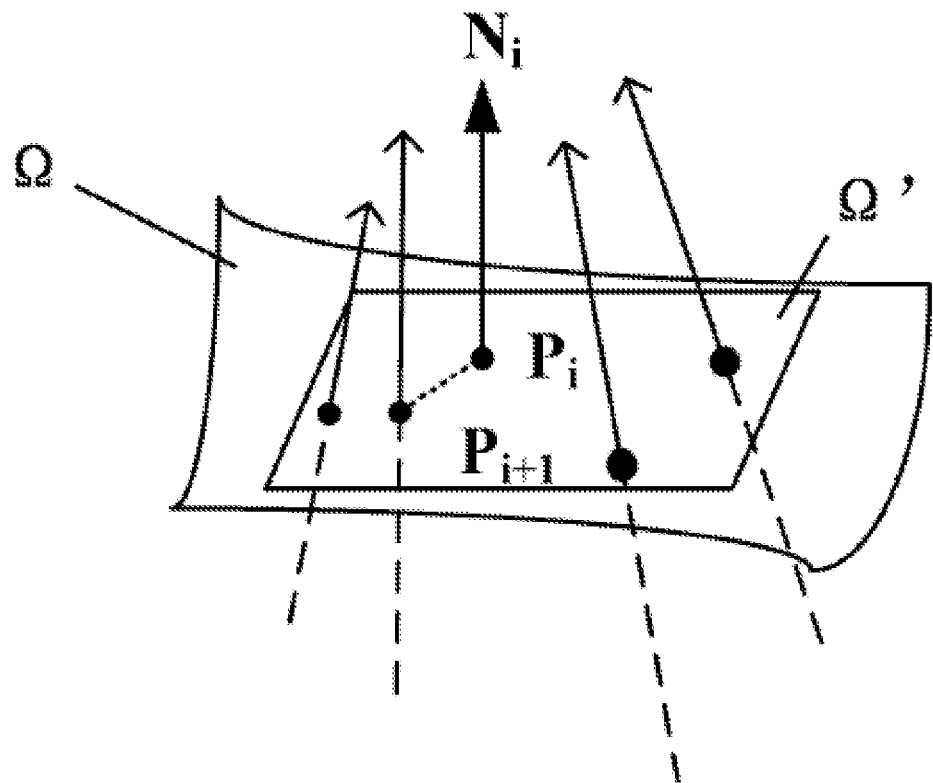
FIG. 4 is a schematic view of tangent planes while solving the feature data points according to one embodiment.

FIGS. 3 and 4 illustrate a surface Ω is defined as the unknown freeform surface, a surface Ω−1 is defined as a surface located adjacent to and before the surface Ω, and a surface Ω+1 is defined as a surface located adjacent to and behind the surface Ω. The intersections of the plurality of first feature rays $R_i$ (i=1, 2 . . . K) with the surface Ω are defined as the first feature data points $P_i$ (i=1, 2 . . . K). The first feature data points $P_i$ (i=1, 2 . . . K) can be obtained by the intersections of the feature rays $R_i$ (i=1, 2 . . . K) with the surface Ω−1 and the surface Ω+1. The plurality of feature rays $R_i$ (i=1, 2 . . . K) are intersected with the surface Ω−1 at a plurality of start points $S_i$ (i=1, 2 . . . K), and intersected with the surface Ω+1 at a plurality of end points $E_i$ (i=1, 2 . . . K). When the surface Ω and the plurality of first feature rays $R_i$ (i=1, 2 . . . K) are determined, the plurality of start points $S_i$ (i=1, 2 . . . K) of the feature rays $R_i$ (i=1, 2 . . . K) can also be determined. The plurality of end points $E_i$ (i=1, 2 . . . K) can be obtained based on the object-image relationship and Fermat's principle. Under ideal conditions, the plurality of first feature rays $R_i$ (i=1, 2 . . . K) emitted from the plurality of start points $S_i$ (i=1, 2 . . . K) on the surface Ω−1, pass through the plurality of first feature data points $P_i$ (i=1, 2 . . . K) on the surface Ω−2, intersect with the surface Ω+1 at the plurality of end points $E_i$ (i=1, 2 . . . K), and finally intersect with the image detector 180.

In step (S2), the unknown freeform surface is the tertiary mirror 160, the surface Ω−1 is the secondary mirror initial structure 142, and the surface Ω+1 is the image detector 180. The start point $S_i$ of each first feature ray is the intersection of the first feature ray and the secondary mirror initial structure 142, and the end points $E_i$ of each first feature ray is the ideal image point on the image detector 180.

The unit normal vector $\vec{N}_1$ at each of the first feature data point $P_i$ (i=1, 2 . . . K) can be calculated based on the vector form of Snell's Law. When the unknown freeform surface is a reflective surface, $$\vec{N}_i = \frac{\vec{r}'_i - \vec{r}_i}{|\vec{r}'_i - \vec{r}_i|},$$

$$\vec{r}_i = \frac{\overrightarrow{S_iP_i}}{|\overrightarrow{S_iP_i}|}$$

is a unit vector along a direction of an incident ray of the unknown freeform surface;

$$\vec{r}'_i = \frac{\overrightarrow{P_iE_i}}{|\overrightarrow{P_iE_i}|}$$

is a unit vector along a direction of an exit ray of the unknown freeform surface.

The unit normal vector $\vec{N}_1$ at the first feature data points $P_i$ (i=1, 2 . . . K) is perpendicular to the tangent plane at the first feature data points $P_i$ (i=1, 2 . . . K). Thus, the tangent planes at the feature data points $P_i$ (i=1, 2 . . . K) can be obtained.

The plurality of first feature data points $P_i$ (i=1, 2 . . . K) can be obtained by the following calculating methods.

Step (21): defining a first intersection of the first feature ray $R_1$ and the tertiary mirror initial structure 162 as the first feature data point $P_1$;

Step (22): calculating the unit normal vector $\vec{N}_1$ at the first feature data points $P_1$ based on the vector form of Snell's Law;

Step (23): making a tangent plane Ω' at the first feature data points $P_1$, thus, (K−1) intersections can be obtained by the tangent plane ST intersecting with remaining (K−1) first feature rays, and the intersection which is nearest to the first feature data points $P_1$, is fixed from the (K−1) intersections as the next first feature data point $P_2$;

Step (24): repeating steps 22 and 23, after i (2≤i≤K−1) first feature data points are all calculated; calculating the unit normal vector $\vec{N}_1$ at the first feature data poin $P_i$ (2≤i≤K−1) based on the vector form of Snell's Law; making the tangent plane at the first feature data poin $P_i$ (2≤i≤K−1), thus, (K−i) intersections can be obtained by the tangent plane intersecting with remaining (K−i) first feature rays, and the intersection which is nearest to the first feature data points $P_i$ (2≤i≤K−1), is fixed from the (K−i) intersections as the next first feature data point $P_{i+1}$ (2≤i≤K−1), until all the plurality of first feature data points $P_i$ (i=1, 2 . . . K) are calculated.

In Step (21), the first feature ray $R_1$ can be any one of the plurality of first feature rays. In one embodiment, the first feature ray that is closest to the optical axis of the off-axis three-mirror imaging system with freeform surfaces is set as the first feature ray $R_1$, which is beneficial to keeping the primary mirror 120 and the tertiary mirror 160 at approximate continuous tangent. Therefore, the primary mirror 120 and the tertiary mirror 160 can be fabricated on one element, and the off-axis three-mirror imaging system with freeform surfaces 100 is easier to be assembled and aligned.

An equation of the tertiary mirror 160 can be obtained by surface fitting the plurality of first feature data points $P_i$ (i=1, 2 . . . K). The equation can be Zernike polynomials, XY polynomials, or Non-uniform rational B-spline (NURBS).

In step (S3), a light path of the plurality of second feature rays can be depicted as follows. First, the plurality of second feature rays from the image detector 180 reaches the tertiary mirror 160, and is reflected by the tertiary mirror 160 to form a first reflected light R'$_1$. Second, the first reflected light R'$_1$ reaches the secondary mirror initial structure 142, and is reflected by the secondary mirror initial structure 142 to form a second reflected light R'$_2$. Third, the second reflected light R'$_2$ reaches the primary mirror initial structure 122, and is reflected by the primary mirror initial structure 122 to form a third reflected light R'$_3$. Finally, the third reflected light R'$_3$ is received by the object space.

Figure 5:
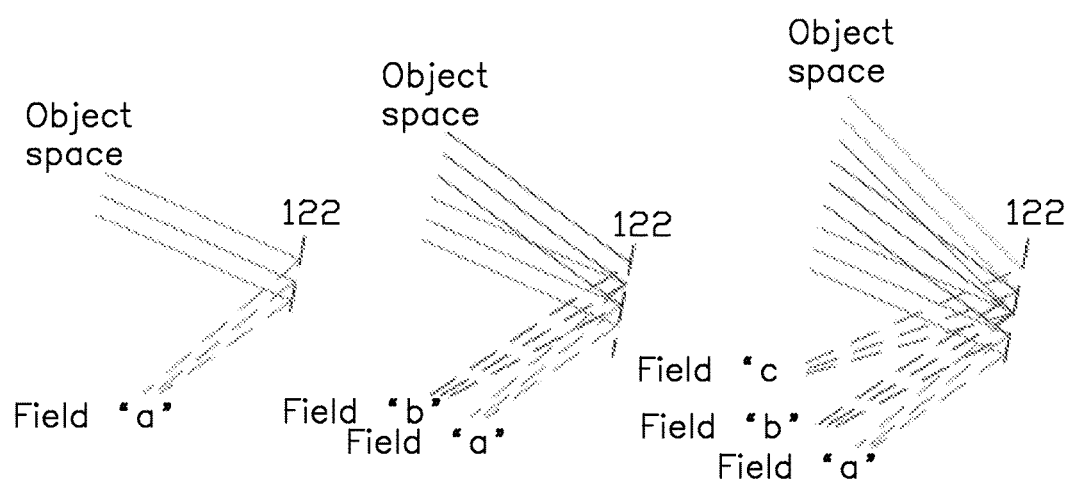
FIG. 5 is a schematic view of a selecting method of fields while solving a primary mirror according to one embodiment.

FIG. 5 illustrates the selecting the plurality of fields includes steps of: (I): selecting a field "a"; (II): selecting a field "b", and the chief ray of the field "b" and the primary mirror initial structure 122 are substantially intersect at the intersection of the margin ray of the field "a" and the primary mirror initial structure 122; repeating steps (I) and (II), until the plurality of fields are all selected, and adjacent fields on the primary mirror initial structure 122 are partially overlapping, such as the field "a", the field "b", and a field "c" shown in FIG. 5.

In one embodiment, adjacent fields on the primary mirror initial structure 122 are approximately 30%-70% overlapping. Such an overlap allows a higher accuracy of surface fitting, and keep the primary mirror 120 continuous and smooth. When the overlap between the last two fields can not reach 30%-70%, the last field can be extended to larger than the maximum FOV, so as to keep adjacent fields on the primary mirror initial structure 122 approximately 30%-70% overlapping.

In one embodiment, ten fields are fixed, the field "a" is the minimum field, and adjacent fields on the primary mirror initial structure 122 are approximately 50% overlapping.

The selecting the plurality of second feature rays is the same as selecting the plurality of first feature rays.

In step (S3), the unknown freeform surface is the primary mirror 120, the surface Ω−1 is the secondary mirror initial structure 142, and the surface Ω+1 can be a virtual surface. The start point S$_i$ of each second feature ray is the intersection of the second feature ray and the secondary mirror initial structure 142, and the end points E$_i$ of each second feature ray is the intersection of the second feature ray and the virtual surface. Other characteristics of the calculating method of the plurality of second feature data points P'$_i$ (i=1, 2 . . . K) are the same as the calculating method of the plurality of second feature data points P$_i$ (i=1, 2 . . . K).

The off-axis three-mirror imaging system with freeform surfaces 100 obtained in one embodiment can be the initial system for further optimization.

An order of steps (S2) and (S3) can be changed according to the actual need.

The method for designing the off-axis three-mirror imaging system with freeform surfaces can be implemented via computer software.

An optimized off-axis three-mirror imaging system with freeform surfaces 200 is designed with the above method and further optimization. The parameters of the optimized off-axis three-mirror optical system with freeform surfaces 200 are given in Table 1.

TABLE 1

Parameters of the optimized off-axis three-mirror optical system with freeform surfaces:

| Parameters | values |
| --- | --- |
| FOV | 70° × 1° |
| effective focal length (EFL) | 75 mm |
| F-number | 5.8 |
| Wavelength | Visible band |
| image detector pixel size | 10 μm × 10 μm |
| MTF | Diffraction limit@100 l p/mm |

Figure 6:
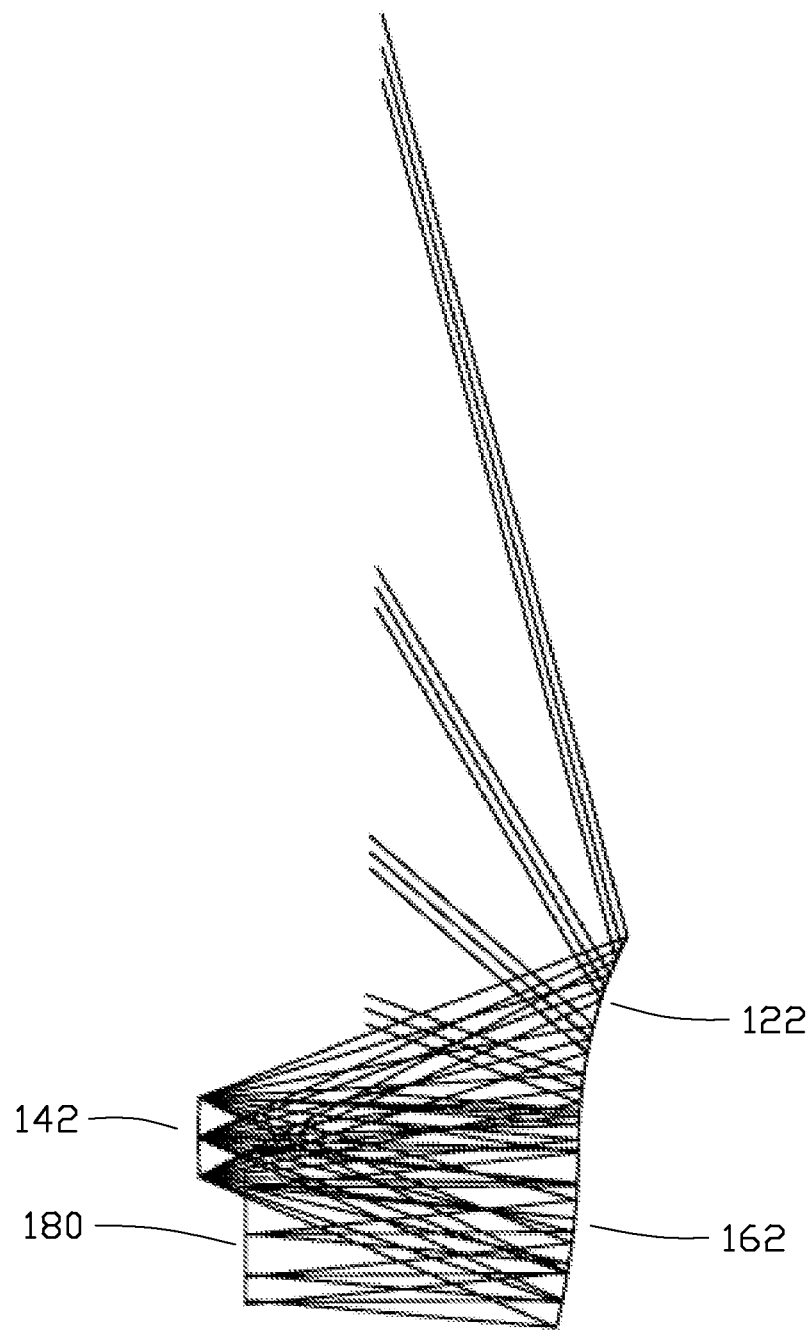
FIG. 6 is a light path schematic view of the spherical initial system in FIG. 2.

FIG. 6 illustrates a spherical initial system was set up with the primary mirror initial structure 122, the secondary mirror initial structure 142, and the tertiary mirror initial structure 162. It can be seen that lights of each field cannot focus on the image detector 180, and intersections of light of each field and the image detector 180 deviate from the ideal image points.

Figure 7:
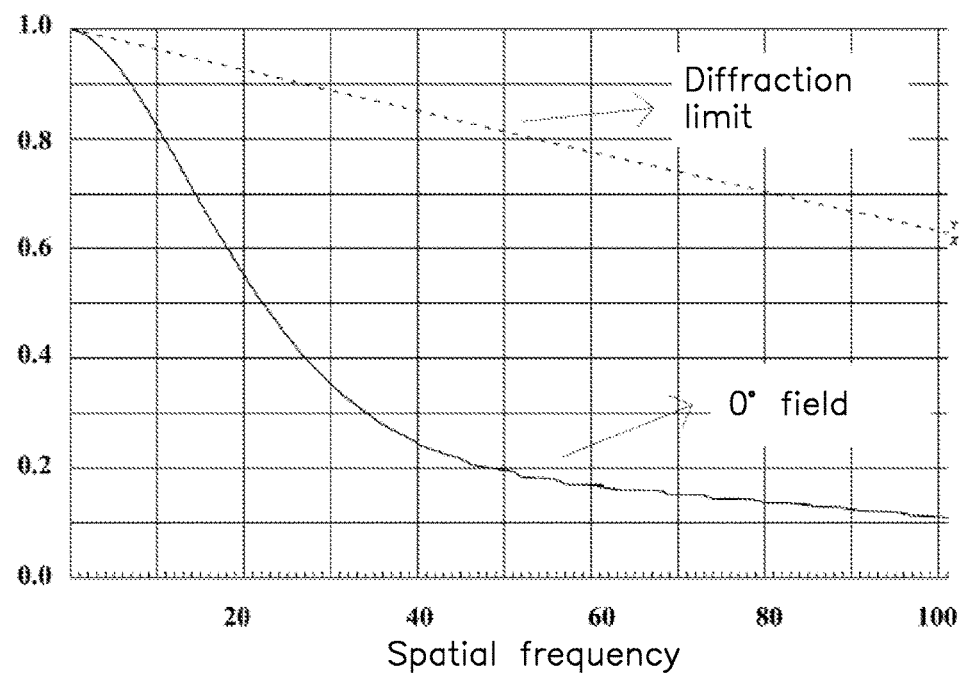
FIG. 7 is a graph showing a modulation transfer functions (MTF) of the spherical initial system in FIG. 2.

FIG. 7 illustrates when the wavelength is about 587.6 nm, and the field angle is about 0°, a modulation transfer functions (MTF) of the spherical initial system is far away from the diffraction limit. It shows that an imaging quality of the spherical initial system is poor.

Figure 8:
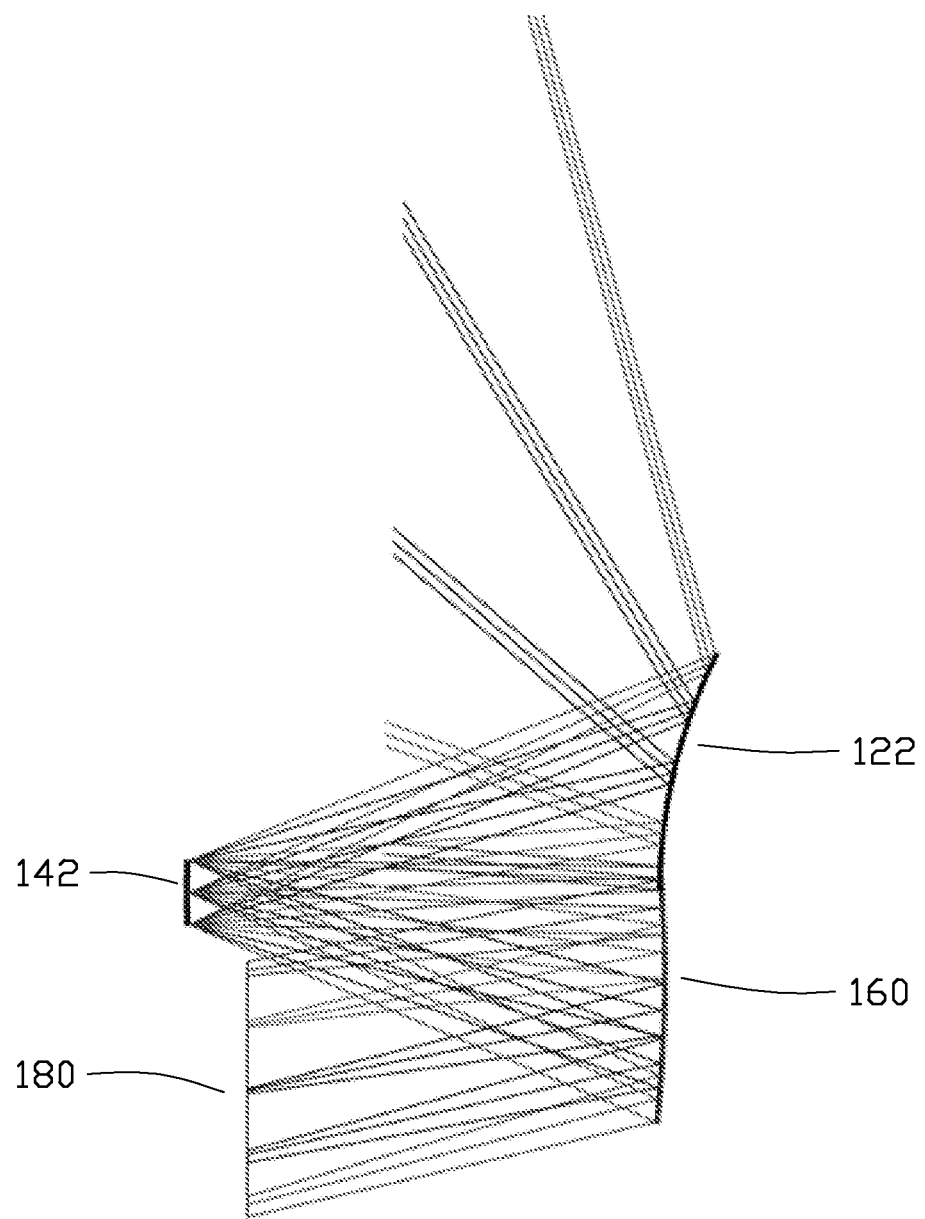
FIG. 8 is a forward light path schematic view of an off-axis three-mirror imaging system with a freeform surface tertiary mirror and a spherical primary mirror.

FIG. 8 illustrates the tertiary mirror initial structure 162 of the spherical initial system is replaced by the tertiary mirror 160 obtained by the above calculating method. It can be seen that the light convergence of each field is improved, which illustrates that the freeform surface, obtained by the designed method, can improve the imaging quality of imaging system.

Figure 9:
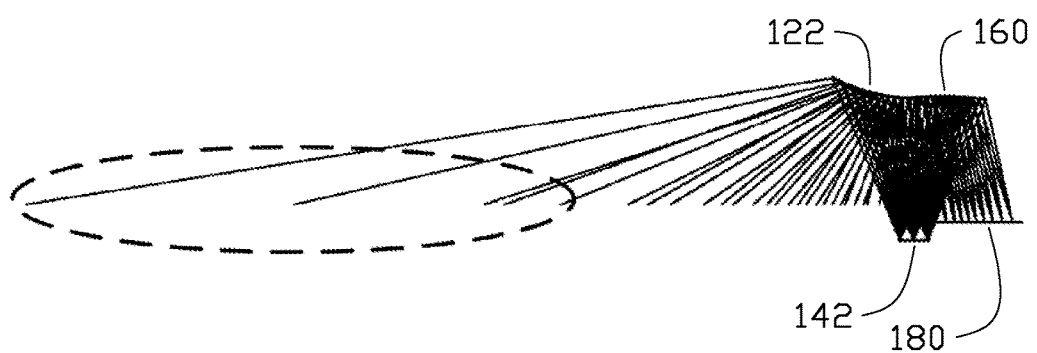
FIG. 9 is a reverse light path schematic view of the off-axis three-mirror imaging system in FIG. 8.

FIG. 9 illustrates the tertiary mirror initial structure 162 of the spherical initial system is replaced by the tertiary mirror 160 obtained by the above calculating method, when the system with the tertiary mirror 160 is reverse ray tracked, the plurality of second feature rays of different fields reflected by the primary mirror initial structure 122 are significantly divergent. However, in an ideal system, the outgoing ray bundles should be exact parallel beams.

Figure 10:
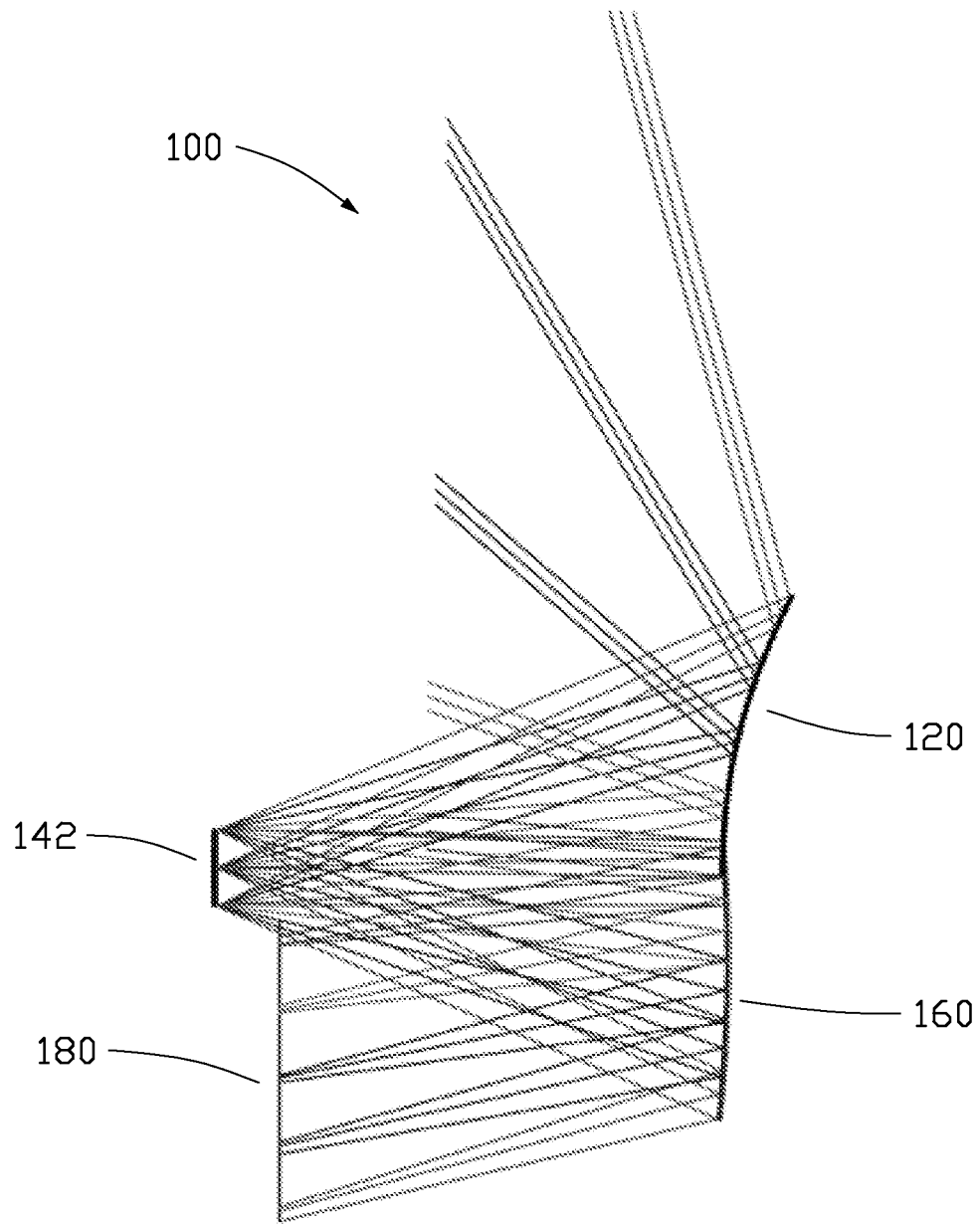
FIG. 10 is a forward light path schematic view of an off-axis three-mirror imaging system with a freeform surface tertiary mirror and a freeform surface primary mirror.

FIG. 10 illustrates the primary mirror initial structure 122 and the tertiary mirror initial structure 162 are respectively replaced by the primary mirror 120, and the tertiary mirror 160. It can be seen that the light of each field can focus approximately to the ideal image points. The image quality can be greatly improved compared to the initial system.

Figure 11:
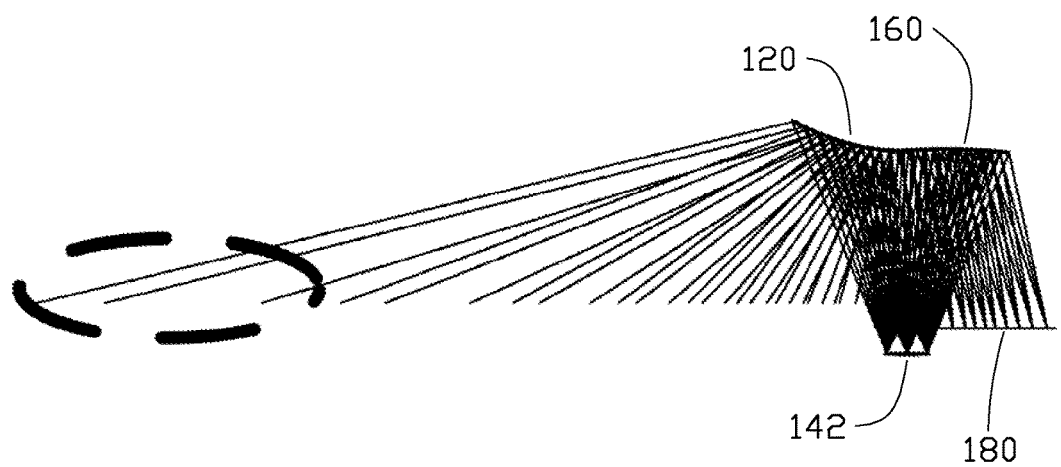
FIG. 11 is a reverse light path schematic view of the off-axis three-mirror imaging system in FIG. 10.

FIG. 11 illustrates the primary mirror initial structure 122 and the tertiary mirror initial structure 162 are respectively replaced by the primary mirror 120, and the tertiary mirror 160, when the system with the primary mirror 120 and the tertiary mirror 160 is reverse ray tracked, the plurality of second feature rays of different fields reflected by the primary mirror 120 are substantially parallel.

Figure 12:
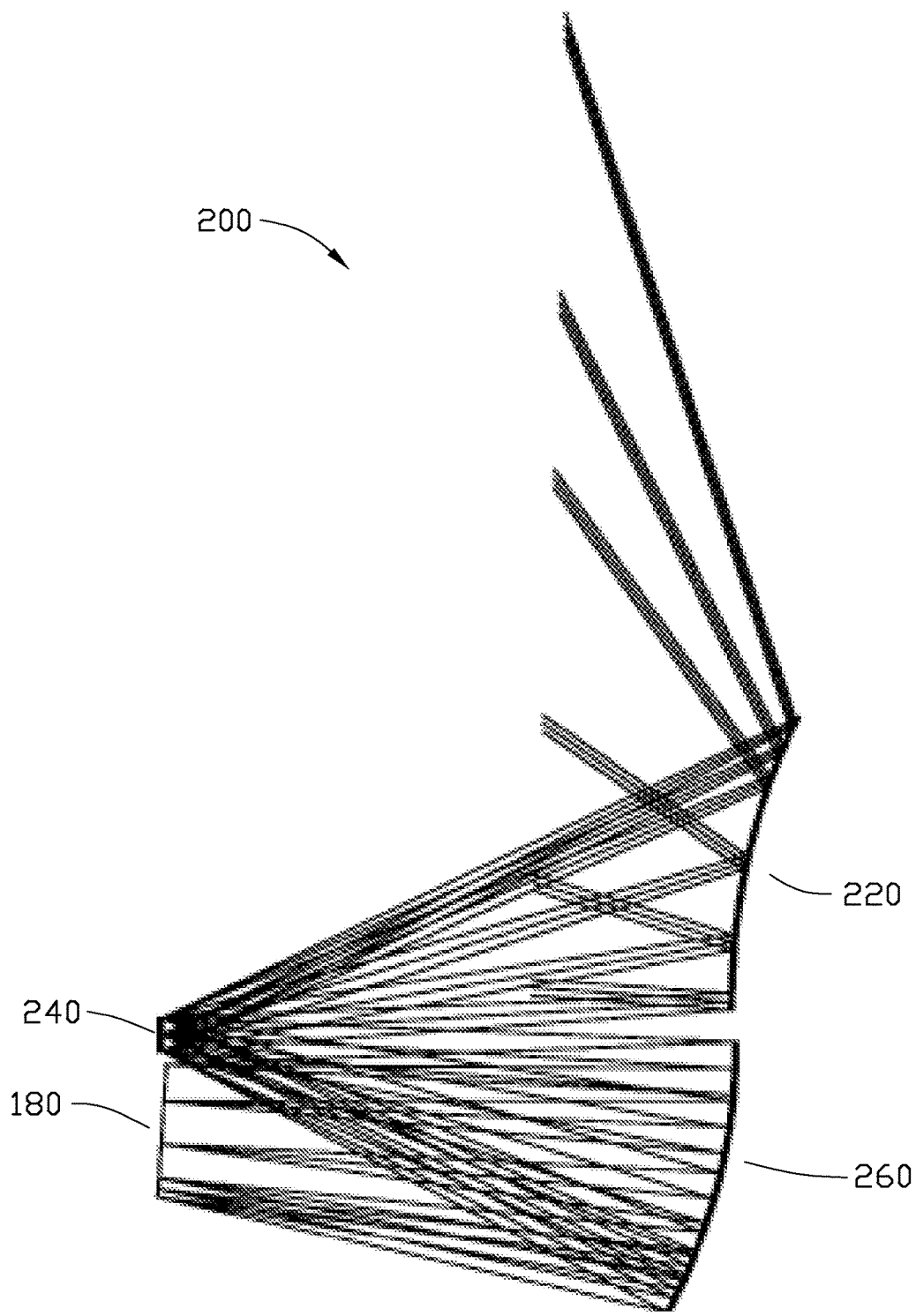
FIG. 12 is a schematic view of one embodiment of an optimized off-axis three-mirror imaging system with freeform surfaces.

FIG. 12 illustrates the optimized off-axis three-mirror imaging system with freeform surfaces 200 includes an optimized primary mirror 220, an optimized secondary mirror 240, and an optimized tertiary mirror 260. It can be seen that the lights of each field can focus approximately to the ideal image points.

Figure 13:
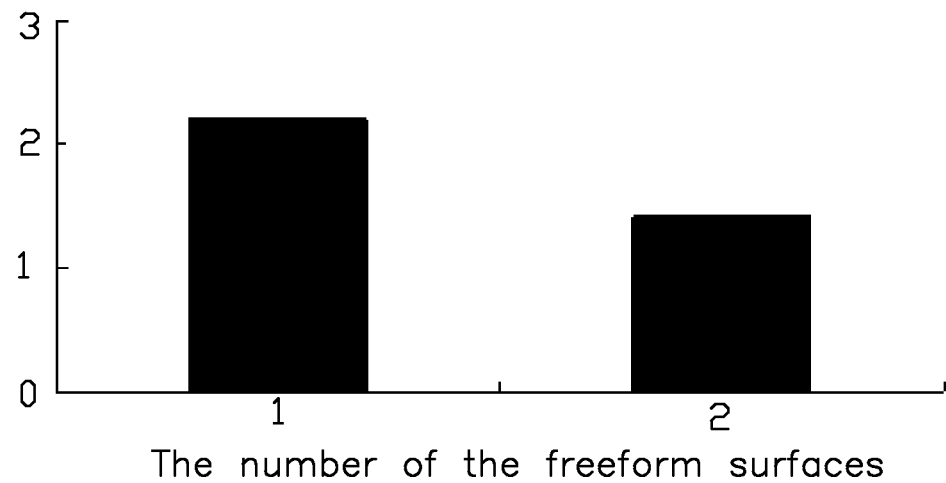
FIG. 13 shows a comparison chart of average root mean squared (RMS) spot diameter of off-axis three-mirror imaging systems with different number of freeform surfaces.

FIG. 13 illustrates a comparison chart of the RMS spot diameter of off-axis three-mirror imaging systems with one freeform surface, and off-axis three-mirror imaging systems with two freeform surfaces. It can be seen that the RMS spot diameter of the off-axis three-mirror imaging systems with two freeform surfaces is smaller than that of the off-axis three-mirror imaging systems with one freeform surface, which illustrates that the image quality of the off-axis three-mirror imaging system with two freeform surfaces is better.

Figure 14:
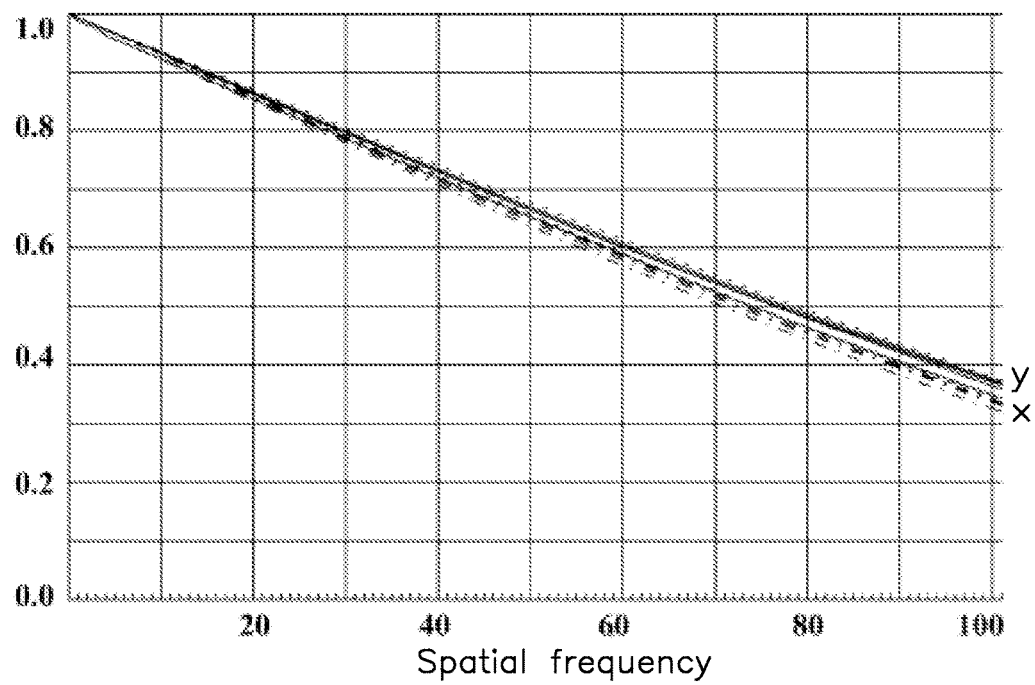
FIG. 14 is a graph showing a modulation transfer functions (MTF) of optimized off-axis three-mirror imaging system with freeform surfaces in FIG. 12.

FIG. 14 illustrates a modulation transfer functions (MTF) in visible band of partial field angles of the optimized off-axis three-mirror imaging system with freeform surfaces 200 is close to the diffraction limit. It shows that the imaging quality of the optimized off-axis three-mirror imaging system with freeform surfaces 200 is high.

Figure 15:
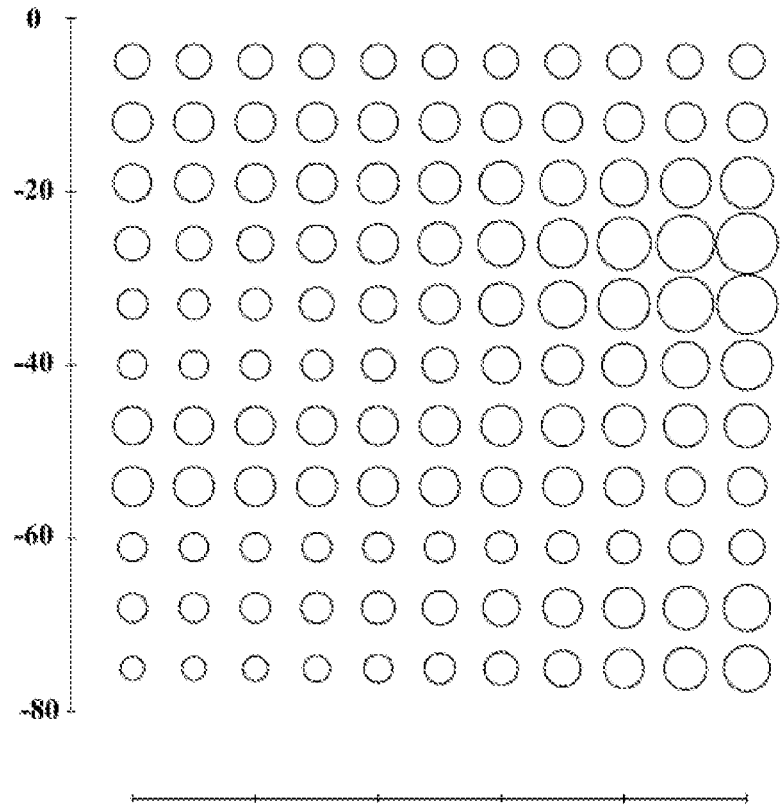
FIG. 15 is a graph showing a RMS wave front error of the optimized off-axis three-mirror imaging system with freeform surfaces in FIG. 12.

FIG. 15 illustrates the RMS wave front error of the optimized off-axis three-mirror imaging system with freeform surfaces 200. It can be seen that the maximum value of the RMS wave front error is about $\lambda/32$, and the average value of the RMS wave front error is about $\lambda/55$. It shows that the RMS wave front error of the optimized off-axis three-mirror imaging system with freeform surfaces 200 is low; therefore, the imaging quality of the optimized off-axis three-mirror imaging system with freeform surfaces 200 is high.

The method for designing the off-axis three-mirror imaging systems with freeform surfaces can have many advantages.

The primary mirror is obtained by a reverse ray tracing, the primary mirror is traced after the aperture stop, and thus, the changes of the optical power of the primary mirror during the designing process will not affect the size and position of the aperture stop.

Adjacent fields on the primary mirror initial structure 122 are partially overlapping, which can avoid lower accuracy of surface fitting caused by narrow beams, and keep the primary mirror 120 continuous and smooth.

The method can be applied in imaging systems with multi-fields and certain aperture, by controlling the feature rays of the multi-fields and different aperture positions, and the number of fields is not limited, thus, the designing method has broad applications.

Given the object-image relationships and the spherical initial system, each freeform surface of the off-axis three-mirror imaging system with freeform surfaces can be generated by a point by point imaging constructing method. Thus, the method for designing off-axis three-mirror imaging system with freeform surfaces is simple and can be applied to various off-axis asymmetric systems.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for designing an off-axis three-mirror imaging system with freeform surfaces, the method comprising:
    establishing an initial system, the initial system includes a primary mirror initial structure, a secondary mirror initial structure, and a tertiary mirror initial structure;
    keeping the primary mirror initial structure and the secondary mirror initial structure unchanged; selecting a plurality of first feature rays, the plurality of first feature rays are forward rays tracked from an object space to an image detector; and calculating a plurality of first feature data points point by point based on an object-image relationship of the plurality of first feature rays, to obtain a tertiary mirror by surface fitting the plurality of first feature data points; and
    keeping the secondary mirror initial structure and the tertiary mirror unchanged; selecting a plurality of fields and a plurality of second feature rays, the plurality of second feature rays are reverse rays tracked from the image detector to the object space; and calculating a plurality of second feature data points point by point based on an object-image relationship of the plurality of second feature rays, to obtain a primary mirror by surface fitting the plurality of second feature data points.

2. The method of claim 1, further comprising optimizing the off-axis three-mirror imaging system with freeform surfaces.

3. The method of claim 2, wherein the off-axis three-mirror imaging system with freeform surfaces is as the initial system for further optimization.

4. The method of claim 1, wherein the primary mirror initial structure, the secondary mirror initial structure, or the tertiary mirror initial structure is planar or spherical.

5. The method of claim 1, wherein the selecting the plurality of first feature rays comprises: selecting M fields; dividing an aperture of each of the M fields into N equal parts; and P feature rays at different positions in each of the N equal parts are selected, thus, K=M×N×P different first feature rays are selected.

6. The method of claim 5, wherein the aperture of each of the M fields is circle, the aperture of each of the M fields is divided into N angles with equal intervals, and P different positions are selected along a radial direction of each of the N angles.

7. The method of claim 1, wherein a number of the plurality of first feature data points is defined as i, a number of the plurality of first feature rays is defined as K, the calculating the plurality of first feature data points comprises:
    defining a first intersection of a first feature ray $R_1$ and the tertiary mirror initial structure as a first feature data point $P_1$;
    after j first feature data points are calculated, wherein j is a number of first feature data points that have been calculated, a value of j is less than a value of i, a jth first feature data point is defined as a first feature data point $P_j$, calculating an unit normal vector $\vec{N_j}$ at the first feature data point $P_j$ based on a vector form of Snell's Law; and
    making a tangent plane at the first feature data point $P_j$, thus, K-j intersections are obtained by the tangent plane intersecting with remaining K-j first feature rays; and the intersection, which is nearest to the first feature data point $P_j$, is fixed from the K-j intersections as a next first feature data point, until all the plurality of first feature data points are calculated.

8. The method of claim 7, wherein the first feature ray $R_1$ is most close to an optical axis of the off-axis three-mirror imaging system with freeform surfaces.

9. The method of claim 7, wherein the unit normal vector $\vec{N_j}$ is calculated as follows:

$$\vec{N_j} = \frac{\vec{r}_j' - \vec{r}_j}{|\vec{r}_j' - \vec{r}_j|};$$

wherein $r_j$ is an incident ray, $$\vec{r}_j = \frac{\overrightarrow{P_j S_j}}{|\overrightarrow{P_j S_j}|}$$

is an incident ray direction unit vector of the tertiary mirror; $r'_j$ is an exit ray, $$\vec{r}_j' = \frac{\overrightarrow{E_j P_j}}{|\overrightarrow{E_j P_j}|}$$

is an exit ray direction unit vector of the tertiary mirror; $S_j$ are intersections of the plurality of first feature rays and the secondary mirror initial structure, and $E_j$ are ideal image points on the image detector.

10. The method of claim 1, wherein a number of the plurality of second feature data points is defined as i, a number of the plurality of first feature rays is defined as K, the calculating the plurality of second feature data points comprises:

defining a first intersection of a second feature ray $R'_1$ and the primary mirror initial structure as a second feature data point $P'_1$;

after j second feature data points are calculated, wherein j is a number of second feature data points that have been calculated, a value of j is less than a value of i, a jth second feature data point is defined as a second feature data point $P_j$, calculating an unit normal vector $\vec{N'_j}$ at the second feature data point $P_j$ based on a vector form of Snell's Law; and making a tangent plane at the second feature data point $P_j$, thus, K-j intersections are obtained by the tangent plane intersecting with remaining K-j second feature rays; and the intersection, which is nearest to the j second feature data points, is fixed from the K-j intersections as a next second feature data point, until all the plurality of second feature data points are calculated.

11. The method of claim 10, wherein the second feature ray $R'_1$ is most close to an optical axis of the off-axis three-mirror imaging system with freeform surfaces.

12. The method of claim 10, wherein the unit normal vector $\vec{N'_j}$ is calculated as follows:

$$\vec{N'_j} = \frac{\vec{r'_j} - \vec{r_j}}{|\vec{r'_j} - \vec{r_j}|};$$

wherein $r_j$ is an incident ray, $$\vec{r_j} = \frac{\overrightarrow{P_j S_j}}{|\overrightarrow{P_j S_j}|}$$

is an incident ray direction unit vector of the primary mirror; $r'_j$ is an exit ray, $$\vec{r'_j} = \frac{\overrightarrow{E_j P_j}}{|\overrightarrow{E_j P_j}|}$$

is an exit ray direction unit vector of the primary mirror; $S_j$ are intersections of the plurality of second feature rays and the secondary mirror initial structure, and $E_j$ are intersections of the plurality of second feature rays and a virtual surface located adjacent to and before the primary mirror.

13. The method of claim 1, wherein the selecting the plurality of fields comprises:
(I): selecting a field "a";
(II): selecting a field "b", and a chief ray of the field "b" and the primary mirror initial structure are substantially intersect at an intersection of a margin ray of the field "a" and the primary mirror initial structure; and
(III) repeating steps (I) and (II), until the plurality of fields are all selected, and adjacent fields on the primary mirror initial structure are partially overlapping.

14. The method of claim 13, wherein the adjacent fields on the primary mirror initial structure are 30%-70% overlapping.

15. The method of claim 14, wherein the adjacent fields on the primary mirror initial structure are about 50% overlapping.

16. The method of claim 1, wherein the plurality of second feature rays transport as follows; firstly, the plurality of second feature rays from the image detector reaches the tertiary mirror obtained by surface fitting the plurality of first feature data points, and is reflected by the tertiary mirror obtained by surface fitting the plurality of first feature data points to form a first reflected light; secondly, the first reflected light reaches the secondary mirror initial structure, and is reflected by the secondary mirror initial structure to form a second reflected light; thirdly, the second reflected light reaches the primary mirror initial structure, and is reflected by the primary mirror initial structure to form a third reflected light; finally, the third reflected light is received by the object space.

* * * * *